(12) United States Patent
Eom et al.

(10) Patent No.: US 10,446,811 B2
(45) Date of Patent: Oct. 15, 2019

(54) BATTERY MODULE AND BATTERY PACK INCLUDING THE SAME

(71) Applicant: LG CHEM, LTD., Seoul (KR)

(72) Inventors: Young-Sop Eom, Daejeon (KR); Nam-In Kim, Daejeon (KR); Jae-Hyun Seo, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/545,495

(22) PCT Filed: Sep. 12, 2016

(86) PCT No.: PCT/KR2016/010288
§ 371 (c)(1),
(2) Date: Jul. 21, 2017

(87) PCT Pub. No.: WO2017/073908
PCT Pub. Date: May 4, 2017

(65) Prior Publication Data
US 2018/0006281 A1    Jan. 4, 2018

(30) Foreign Application Priority Data

Oct. 30, 2015 (KR) .......................... 10-2015-0152126

(51) Int. Cl.
*H01M 2/10* (2006.01)
*H01M 2/20* (2006.01)
(Continued)

(52) U.S. Cl.
CPC ......... *H01M 2/1077* (2013.01); *H01M 2/206* (2013.01); *H01M 2/26* (2013.01); *H01M 10/482* (2013.01); *H01M 2220/20* (2013.01)

(58) Field of Classification Search
CPC ...... H01M 2/1077; H01M 2/206; H01M 2/26; H01M 10/482; H01M 2220/20
See application file for complete search history.

(56) References Cited

U.S. PATENT DOCUMENTS

| | | | |
|---|---|---|---|
| 2002/0102457 A1* | 8/2002 | Oogami | B60L 3/0046 |
| | | | 429/159 |
| 2006/0177733 A1* | 8/2006 | Ha | H01M 2/0212 |
| | | | 429/159 |

(Continued)

FOREIGN PATENT DOCUMENTS

| | | |
|---|---|---|
| EP | 2 590 243 A2 | 5/2013 |
| JP | 2013-37777 A | 2/2013 |

(Continued)

OTHER PUBLICATIONS

International Search Report issued in PCT/KR2016/010288 (PCT/ISA/210), dated Dec. 20, 2016.

*Primary Examiner* — Osei K Amponsah
(74) *Attorney, Agent, or Firm* — Birch, Stewart, Kolasch & Birch, LLP (57) ABSTRACT

Disclosed is a battery module, including a cartridge laminate including a plurality of secondary batteries, each having an electrode lead, and a plurality of cartridges configured to respectively accommodate at least one secondary battery among the secondary batteries and stacked at multi stages; an integrated circuit board (ICB) housing having a bus bar connected to the electrode lead at a predetermined connection point and coupled to one surface of the cartridge laminate; and a sensing unit having a connection wire disposed to pass through the ICB housing and connected to the bus bar to allow voltages of the secondary batteries to be sensed, wherein the ICB housing further includes a wire fixing unit having a wire fixing recess formed by indenting an outer surface of the ICB housing toward an inner surface (Continued)

of the ICB housing to be located near the inner surface of the ICB housing in comparison to the connection point, and at least a part of the connection wire is inserted into and fixed in the wire fixing recess.

12 Claims, 8 Drawing Sheets

(51) Int. Cl.
*H01M 2/26* (2006.01)
*H01M 10/48* (2006.01)

(56) References Cited

U.S. PATENT DOCUMENTS

| | | |
|---|---|---|
| 2011/0059342 A1 | 3/2011 | Lee et al. |
| 2013/0101883 A1 | 4/2013 | Zhao |
| 2015/0285839 A1 | 10/2015 | Merriman et al. |
| 2016/0248070 A1 | 8/2016 | Ahn |
| 2016/0268652 A1 | 9/2016 | Eom et al. |

FOREIGN PATENT DOCUMENTS

| | | |
|---|---|---|
| JP | 2013-77500 A | 4/2013 |
| KR | 10-2014-0062171 A | 5/2014 |
| KR | 10-2015-0050314 A | 5/2015 |
| KR | 10-2015-0062743 A | 6/2015 |
| KR | 10-2015-0062777 A | 6/2015 |

* cited by examiner

BATTERY MODULE AND BATTERY PACK INCLUDING THE SAME

TECHNICAL FIELD

The present disclosure relates to a battery module and a battery pack including the same.

The present application claims priority to Korean Patent Application No. 10-2015-0152126 filed on Oct. 30, 2015 in the Republic of Korea, the disclosures of which are incorporated herein by reference.

BACKGROUND ART

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also for middle-sized or large-sized devices such as vehicles and power storages. When secondary batteries are used for such middle-sized or large-sized devices, a great number of secondary batteries are electrically connected to enhance capacity and output. In particular, for such middle-sized or large-sized devices, pouch-type secondary batteries are frequently used since they can be easily accommodated and stacked.

The battery module may be regarded as a configuration where a lot of secondary batteries are connected in series or in parallel to enhance capacity and output. The battery module needs measurement of voltages of the secondary batteries in order to maintain performance stably. In order to measure voltages of the secondary batteries, the battery module includes bus bars connected to electrode leads of the secondary batteries and an ICB housing having wires for connecting the bus bars to an external measurement circuit.

Generally, an electrode lead and a bus bar are connected by means of laser welding. The laser welding is performed after the electrode lead and the bus bar are closely adhered to each other by compression using a compression jig. However, the wire electrically connected to the bus bar inevitably passes near the bus bar, and thus the wire is likely to be interposed between the compression jig and the ICB housing, which results in imperfect adhesion between the electrode lead and the bus bar. Therefore, in an existing battery module, bad welding may occur between the electrode lead and the bus bar, and the wire may be damaged due to the compression jig.

DISCLOSURE

Technical Problem

The present disclosure is designed to solve the problems of the related art, and therefore the present disclosure is directed to providing a battery module having an improved structure so that a wire electrically connected to a bus bar does not cause bad welding and the wire is not damaged when an electrode lead of a secondary battery is laser-welded to the bus bar, and a battery pack including the same.

Technical Solution

In one aspect of the present disclosure, there is provided a battery module, comprising: a cartridge laminate including a plurality of secondary batteries, each having an electrode lead, and a plurality of cartridges configured to respectively accommodate at least one secondary battery among the secondary batteries and stacked at multi stages; an integrated circuit board (ICB) housing having a bus bar connected to the electrode lead at a predetermined connection point and coupled to one surface of the cartridge laminate; and a sensing unit having a connection wire disposed to pass through the ICB housing and connected to the bus bar to allow voltages of the secondary batteries to be sensed, wherein the ICB housing further includes a wire fixing unit having a wire fixing recess formed by indenting an outer surface of the ICB housing toward an inner surface of the ICB housing to be located near the inner surface of the ICB housing in comparison to the connection point, and at least a part of the connection wire is inserted into and fixed in the wire fixing recess.

Preferably, the ICB housing may further include a lead hole through which an end of the electrode lead passes.

Preferably, the bus bar may be coupled to the outer surface of the ICB housing, and the electrode lead may have a connection portion formed by bending an end of the electrode lead, which protrudes out of the ICB housing through the lead hole, at a predetermined angle, and the connection portion is connected to the bus bar at the connection point.

Preferably, the bus bar and the connection portion may be connected at the connection point by means of laser welding.

Preferably, the wire fixing unit may further include a plurality of insertion protrusions protruding from the wire fixing recess at predetermined intervals so that the connection wire is inserted into the wire fixing recess.

Preferably, the sensing unit may include: a sensing connector assembly having a sensing wire connected to the bus bar and a sensing connector coupled to an end of the sensing wire; and a connector assembly having a sub-connector coupled and connected to the sensing connector and a main connector coupled and connected to a circuit connector included in an external measurement circuit and electrically connected to the sub-connector by means of the connection wire.

In another aspect of the present disclosure, there is also provided a battery module, comprising: a cartridge laminate including a plurality of secondary batteries, each having an electrode lead, and a plurality of cartridges configured to respectively accommodate at least one secondary battery among the secondary batteries and stacked at multi stages; an ICB housing having a bus bar connected to the electrode lead at a predetermined connection point and coupled to one surface of the cartridge laminate; and a connection wire disposed to pass through the ICB housing and connected to the bus bar, wherein the ICB housing further includes a wire fixing unit having a wire fixing recess formed by indenting an outer surface of the ICB housing toward an inner surface of the ICB housing to be located near the inner surface of the ICB housing in comparison to the connection point, and at least a part of the connection wire is inserted into and fixed in the wire fixing recess.

In another aspect of the present disclosure, there is also provided a battery pack, which comprises the battery module described above.

In another aspect of the present disclosure, there is also provided a vehicle, which comprises the battery pack described above.

Advantageous Effects

The battery module according to the present disclosure and the battery pack including the same may ensure stable measurement of voltages of secondary batteries by preventing a connection wire from being damaged when electrode leads and bus bars of secondary batteries are laser-welded, since the connection wire is located at an inner side of the battery module in comparison to connection points where the electrode leads and the bus bars of the secondary batteries are laser-welded.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, each component or a specific portion of each component is depicted in an exaggerated, excluded or simplified state for the convenience of understanding and clarity. Therefore, the size of each component may not fully reflect an actual size. Also, any explanation of the prior art known to relate to the present invention may be omitted if it is regarded to render the subject matter of the present invention vague.

Figure 1:
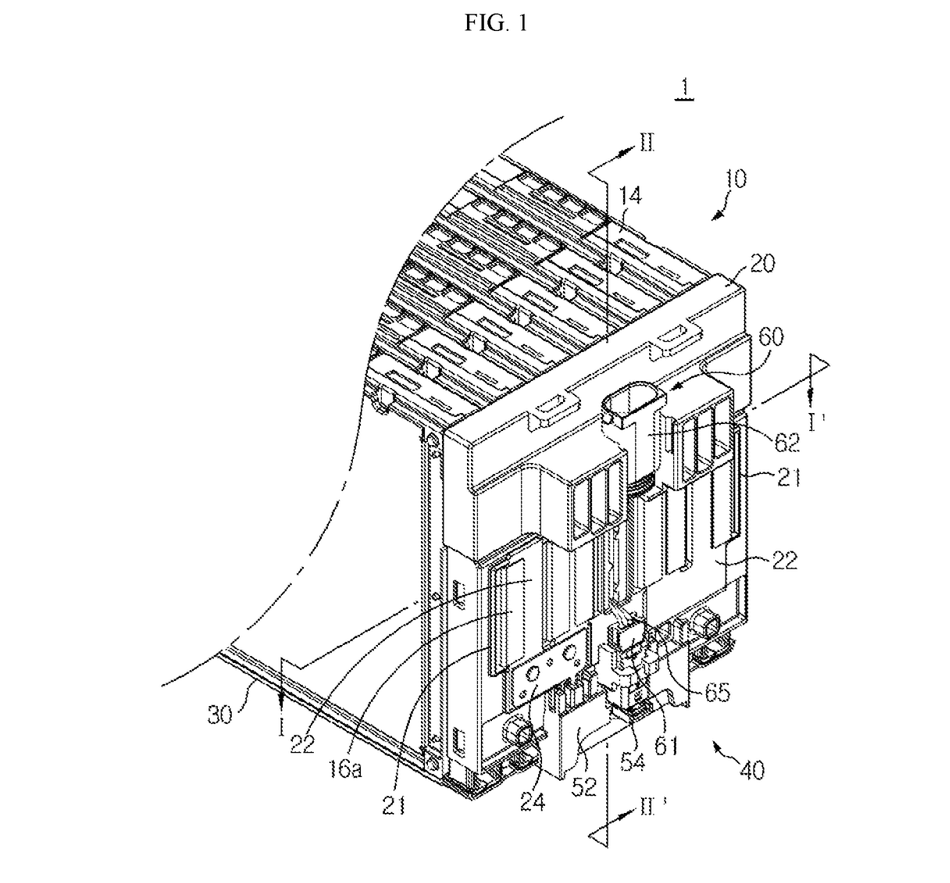
FIG. 1 is a perspective view schematically showing a battery module according to an embodiment of the present disclosure.

FIG. 1 is a perspective view schematically showing a battery module according to an embodiment of the present disclosure.

Referring to FIG. 1, a battery module 1 according to an embodiment of the present disclosure includes a cartridge laminate 10 having a plurality of cartridges 14, each accommodating a secondary battery 12; an integrated circuit board (ICB) housing 20 having a bus bar 22 connected to the electrode lead 16 and coupled to one surface of the cartridge laminate 10; and a sensing unit 40 having a connection wire 63 disposed to pass through the ICB housing 20 to sense voltages of the secondary batteries 12 from the bus bar 22. A plurality of such battery modules 1 may be connected by means of a predetermined electric connection way to configure a battery pack. In addition, the battery pack may be installed at a vehicle and used therefor.

Figure 2:
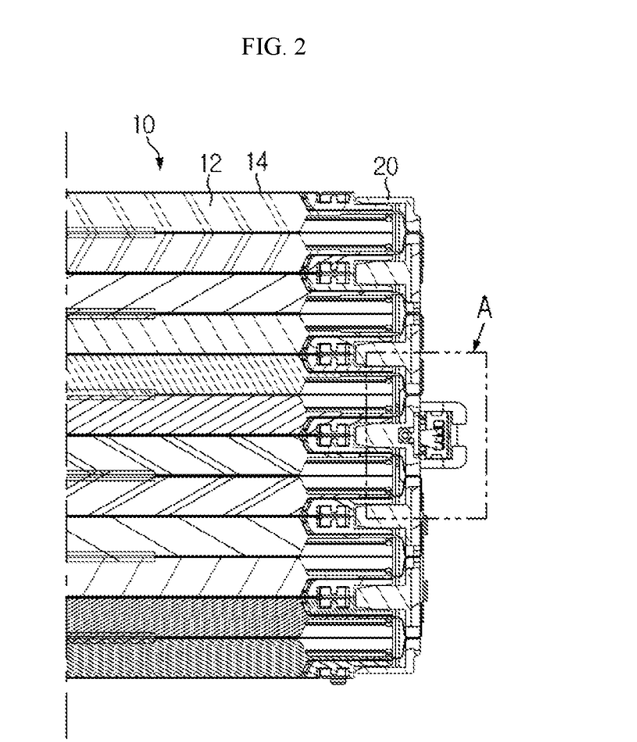
FIG. 2 is a cross-sectional view showing the battery module, taken along the line I-I' of FIG. 1.
Figure 3:
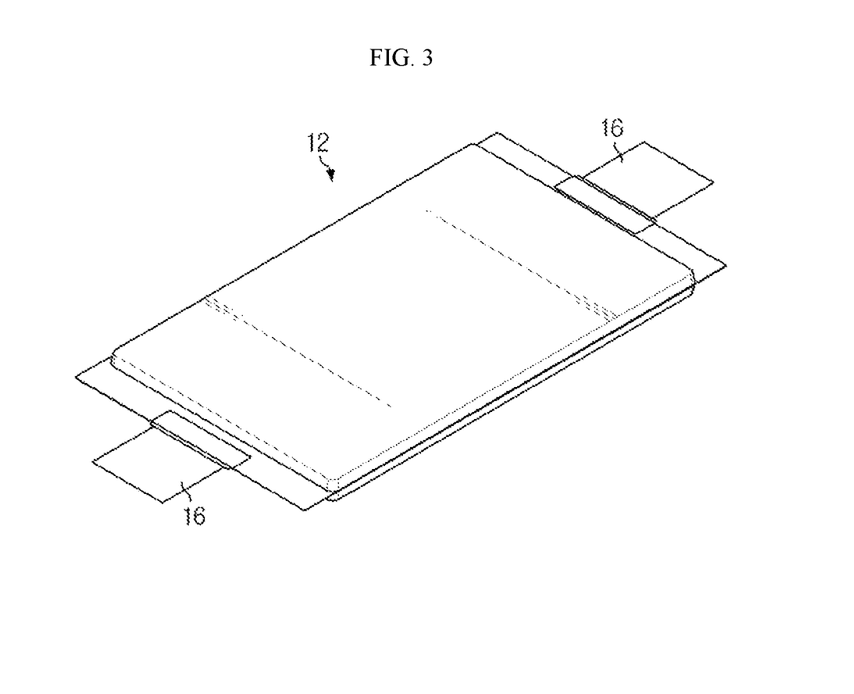
FIG. 3 is a perspective view schematically showing a secondary battery.

FIG. 2 is a cross-sectional view showing the battery module, taken along the line I-I' of FIG. 1, and FIG. 3 is a perspective view schematically showing a secondary battery.

First, the cartridge laminate 10 is a member for accommodating a plurality of secondary batteries 12.

As shown in FIG. 2, the cartridge laminate 10 includes a plurality of secondary batteries 12 and a plurality of cartridges 14, each of which accommodates at least one secondary battery 12 among the secondary batteries 12.

The secondary batteries 12 may be lithium polymer batteries. However, the secondary batteries 12 may also be lithium ion batteries, nickel cadmium batteries, nickel hydrogen batteries, nickel zinc batteries or the like, without being limited to the above.

As shown in FIG. 3, the secondary batteries 12 may be pouch-type batteries. However, the secondary batteries 12 may also have a cylindrical shape, a rectangular shape or the like, without being limited to the above.

As shown in FIG. 3, the secondary battery 12 includes a pair of electrode leads 16. One of the electrode leads 16 is provided at one end of the secondary battery 12 and has one of positive and negative polarities. The other of the electrode leads 16 is provided at the other end of the secondary battery 12 and has one of negative and positive polarities.

As shown in FIG. 2, the cartridges 14 respectively accommodate and hold the secondary batteries 12 so that the electrode leads 16 protrude out of the cartridges 14. Therefore, the secondary batteries 12 are not shaken by means of the cartridges 14.

The cartridges 14 may be stacked with each other so as to facilitate stacking and assembling of the secondary batteries 12. Therefore, the cartridges 14 are stacked to form the cartridge laminate 10 at multi stages.

Figure 4:
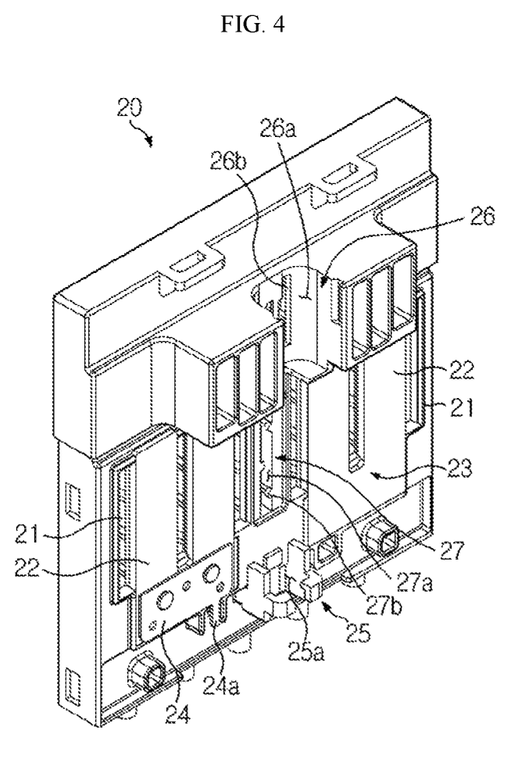
FIG. 4 is a perspective view showing an ICB housing depicted in FIG. 1.
Figure 5:
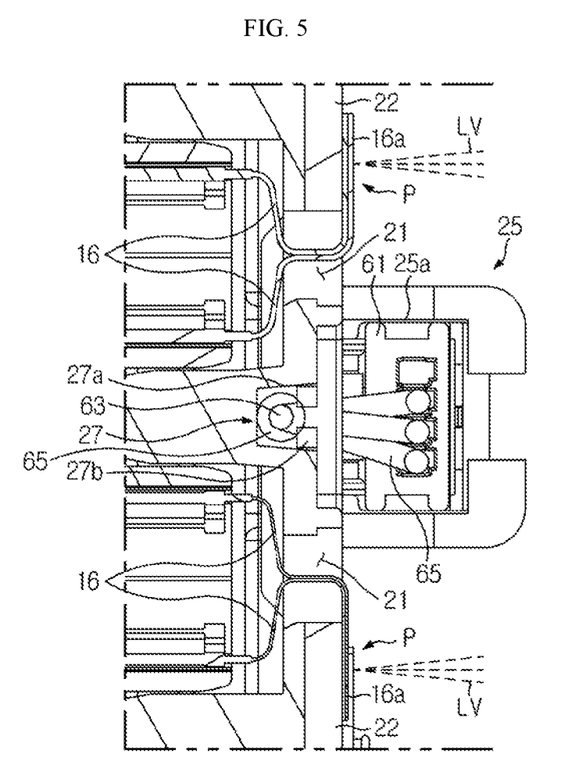
FIG. 5 is a partially enlarged view showing a portion A of FIG. 2.

FIG. 4 is a perspective view showing an ICB housing depicted in FIG. 1, and FIG. 5 is a partially enlarged view showing a portion A of FIG. 2.

Next, the ICB housing 20 is a member for electrically connecting the secondary batteries 12.

As shown in FIG. 4, the ICB housing 20 includes lead holes 21 formed to allow the electrode leads 16 of the secondary batteries 12 to pass therethrough, a bus bar 22 electrically connected to the electrode leads 16 of the secondary batteries 12 passing through the lead holes 21, and a connector fixing unit 23 for fixing a connector assembly 60 of the sensing unit 40, explained later. As shown in FIG. 5, the ICB housing 20 is coupled to one side of the cartridge laminate 10 so that the electrode leads 16 of the secondary batteries 12 may respectively pass through the lead holes 21.

As shown in FIG. 4, a plurality of lead holes 21 are formed at predetermined intervals so that the secondary batteries 12 may pass therethrough.

As shown in FIG. 4, the bus bar 22 is coupled to an outer surface of the ICB housing 20 to surround at least a part of the lead holes 21. The number of installed bus bars 22 is not specially limited, and as shown in FIG. 4, at least one bus bar 22 may be installed depending on an electric connection method between the secondary batteries 12 and the bus bar 22.

As shown in FIG. 4, at least one of the bus bars 22 includes a connection tab 24 mounted to a lower end thereof. The connection tab 24 includes a connection pin 24a protruding in a lower direction of the cartridge laminate 10, namely toward a cooling plate 30, explained later.

As shown in FIG. 5, the bus bar 22 is electrically connected to the electrode lead 16 at a predetermined connection point P. For this, as shown in FIG. 5, the electrode lead 16 includes a connection portion 16a formed by bending its end protruding out of the ICB housing 20 through the lead hole 21 so that the end comes into contact with the bus bar 22 at the connection point P mentioned above. The bus bar 22 and the connection portion 16a are connected at the connection point P by means of laser welding.

As shown in FIG. 4, the connector fixing unit 23 includes a sub-connector fixing unit 25 to which a sub-connector 61 of the connector assembly 60 is fixed, a main connector fixing unit 26 to which a main connector 62 of the connector assembly 60 is fixed, and a wire fixing unit 27 to which the connection wire 63 of the connector assembly 60 is fixed.

As shown in FIG. 4, the sub-connector fixing unit 25 has a ring shape and protrudes on the outer surface of the ICB housing 20 to be located at a lower side of the bus bar 22. The sub-connector fixing unit 25 includes a connector insertion hole 25a into which the sub-connector 61 may be inserted and fit.

As shown in FIG. 4, the main connector fixing unit 26 is formed to be located at an upper side of the bus bar 22. In other words, the main connector fixing unit 26 is formed to be spaced apart from the sub-connector fixing unit 25 by a predetermined interval with the bus bar 22 being interposed therebetween. As shown in FIG. 4, the main connector fixing unit 26 includes a connector accommodation recess 26a concavely formed at the outer surface of the ICB housing 20 to accommodate the main connector 62, and a hook hole 26b formed in the connector accommodation recess 26a so that an elastic hook 64 of the main connector 62, explained later, may be inserted therein.

As shown in FIG. 4, the wire fixing unit 27 is provided at the outer surface of the ICB housing 20 to be located between the sub-connector fixing unit 25 and the main connector fixing unit 26. As shown in FIG. 4, the wire fixing unit 27 includes a wire fixing recess 27a concavely formed at the outer surface of the ICB housing 20 so that the connection wire 63 may be inserted and fixed therein, and an insertion protrusion 27b protruding on an inner surface of the wire fixing recess 27a.

As shown in FIG. 4, when a plurality of bus bars 22 are installed, the wire fixing recess 27a may be formed to pass between the bus bars 22, without being limited thereto. As shown in FIG. 5, the wire fixing recess 27a is formed to be indented toward the inner surface of the ICB housing 20 in comparison to the connection point P of the bus bar 22 and the electrode leads 16.

Figure 6:
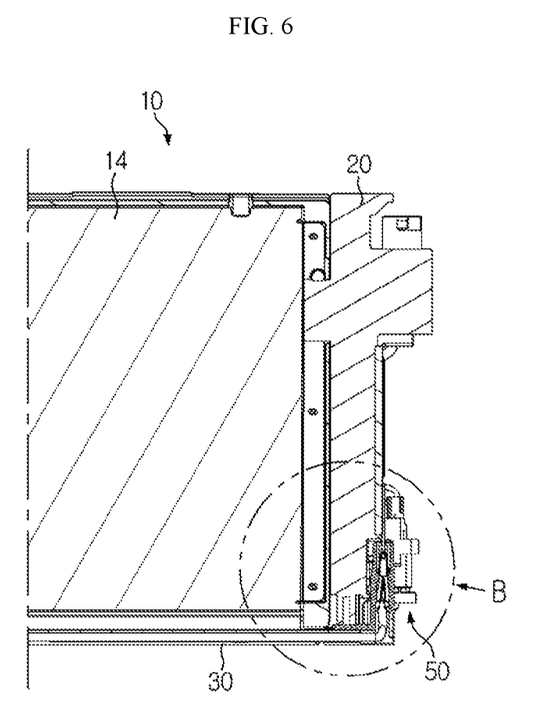
FIG. 6 is a cross-sectional view showing the battery module, taken along the line II-II' of FIG. 1.

FIG. 6 is a cross-sectional view showing the battery module, taken along the line II-II' of FIG. 1.

Next, the cooling plate 30 is a member for receiving heat from the secondary batteries 12 and emitting the heat outwards.

As shown in FIG. 6, the cooling plate is coupled to a lower surface of the cartridge laminate 10 to come into contact with the cartridges 14. A coupling method for the cooling plate 30 and the cartridge laminate 10 is not specially limited, and the cooling plate 30 and the cartridge laminate 10 may be coupled in various ways, for example by means of screwing, hooking or the like. The cooling plate 30 may receive heat generated at the secondary batteries 12 through the cartridges 14 and emit the heat outwards, thereby cooling the secondary batteries 12.

Figure 7:
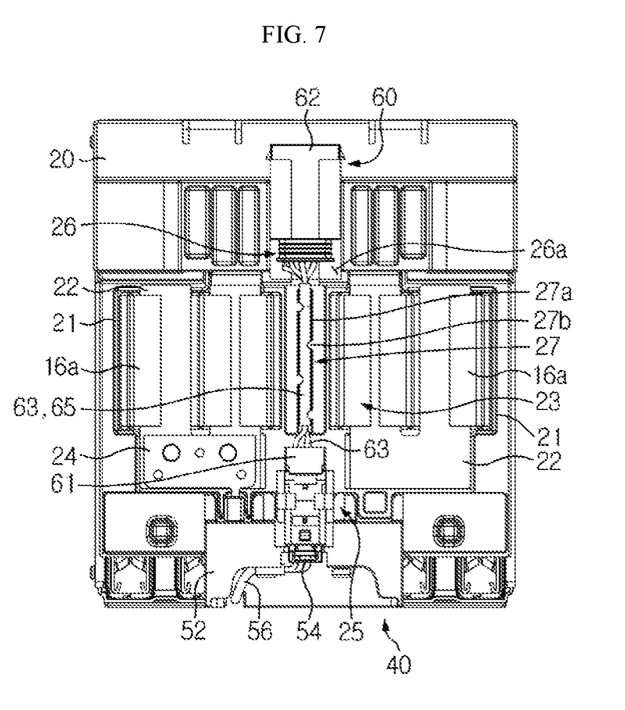
FIG. 7 is a side view showing the battery module depicted in FIG. 2.
Figure 8:
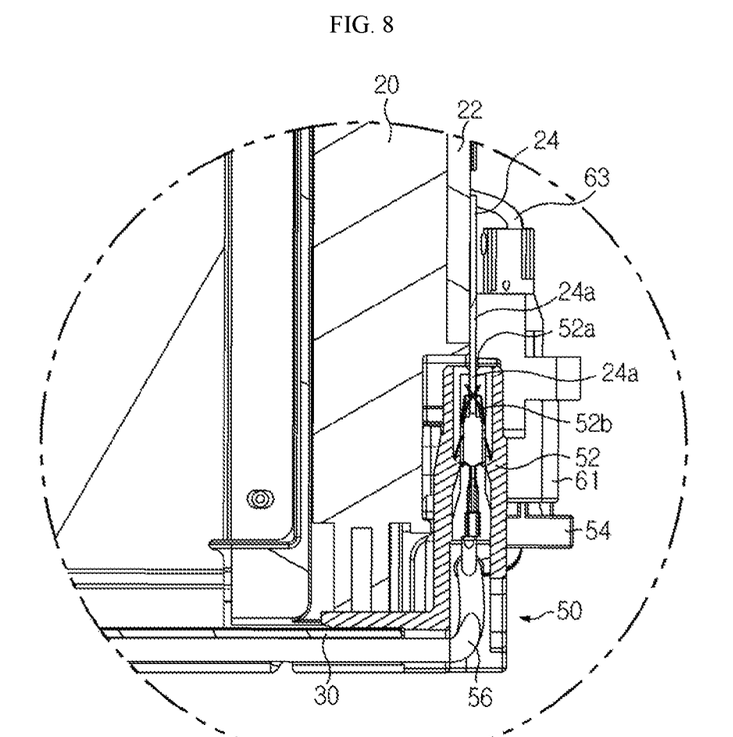
FIG. 8 is a partially enlarged view showing a portion B of FIG. 6.
Figure 9:
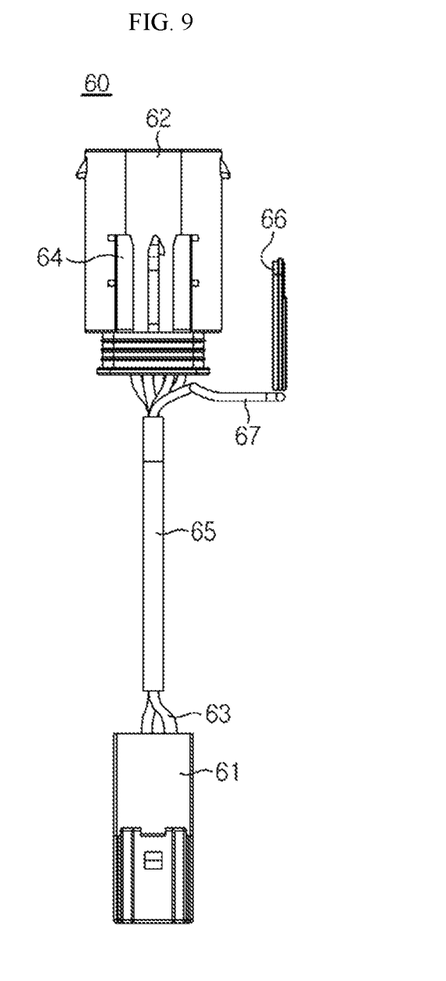
FIG. 9 is a rear view showing a connector assembly depicted in FIG. 7.

FIG. 7 is a side view showing the battery module depicted in FIG. 2, FIG. 8 is a partially enlarged view showing a portion B of FIG. 6, and FIG. 9 is a rear view showing a connector assembly depicted in FIG. 7.

Next, the sensing unit 40 is a member for sensing voltages of the secondary batteries 12.

As shown in FIG. 7, the sensing unit 40 includes a sensing connector assembly 50 connected to the electrode lead 16 of the secondary batteries 12, and a connector assembly 60 for electrically connecting the sensing connector assembly 50 to an external measurement circuit.

As shown in FIG. 7, the sensing connector assembly 50 includes a sensing housing 52 connected to the bus bar 22, a sensing connector 54 connected to the connector assembly 60, and a sensing wire 56 for electrically connecting the sensing housing 52 and the sensing connector 54.

The sensing housing 52 has a connection hole 52a into which the connection pin 24a of the bus bar 22 is inserted, and a receptacle 52b mounted in the connection hole 52a.

As shown in FIG. 8, the connection hole 52a is formed to pass through the sensing housing 52 in a vertical direction. The connection hole 52a has a predetermined shape to allow the connection pin 24a and the receptacle 52b to be respectively inserted and fixed therein.

As shown in FIG. 8, the receptacle 52b is installed in the connection hole 52a so as to be coupled and connected to the connection pin 24a of the bus bar 22, which is inserted into the connection hole 52a. The receptacle 52b may have a clip structure so as to clip the connection pin 24a, without being limited thereto. The receptacle 52b may be electrically connected to the electrode lead 16 of the secondary batteries 12 by means of the bus bar 22 to sense voltages of the secondary batteries 12.

As shown in FIG. 7, the sensing connector 54 is installed and fixed at one side of the sensing housing 52 so as to be connected and coupled to a sub-connector 61 of the connector assembly 60, explained later.

As shown in FIGS. 7 and 8, one end of the sensing wire 56 may be connected and coupled to the receptacle 52b, and the other end of the sensing wire 56 may be connected and coupled to the sensing connector 54, thereby electrically connecting the receptacle 52b and the sensing connector 54.

As shown in FIG. 7, the connector assembly 60 includes a sub-connector 61 connected and coupled to the sensing connector 54, a main connector 62 connected and coupled to a circuit connector of an external measurement circuit, and a connection wire 63 for electrically connecting the sub-connector 61 and the main connector 62.

As shown in FIG. 7, the sub-connector 61 is fit into the connector insertion hole 25a to be installed and fixed to the outer surface of the ICB housing 20. As shown in FIG. 7, the sub-connector 61 may be connected and coupled to the sensing connector 54 to receive the voltages of the secondary batteries 12, sensed by the receptacle 52b, through the sensing connector 54.

As shown in FIG. 9, the main connector 62 includes an elastic hook 64 protruding from a rear surface thereof to be inserted into the hook hole 26b. Therefore, as shown in FIG. 7, as the elastic hook 64 is inserted into the hook hole 26b and then elastically coupled to the ICB housing 20, the main connector 62 may be installed and fixed to the outer surface of the ICB housing 20 in a state of being accommodated in the connector accommodation recess 26a. As shown in FIG. 7, the main connector 62 is electrically connected to the sub-connector 61 by means of the connection wire 63, and is connected and coupled to a circuit connector (not shown) provided at the measurement circuit. If so, the measurement circuit may measure voltages of the secondary batteries 12 by receiving the voltages sensed by the receptacle 52b though the main connector 62.

As shown in FIG. 7, one end of the connection wire 63 is connected and coupled to the sub-connector 61, and the other end of the connection wire 63 is connected and coupled to the main connector 62, thereby electrically connecting the sub-connector 61 and the main connector 62. If a plurality of connection wires 63 is prepared, as shown in FIG. 9, the connection wires 63 may be united in a bundle by means of a wire tie 65.

As shown in FIG. 7, the connection wire 63 is at least partially inserted into the wire fixing recess 27a so as to be covered by the insertion protrusions 27b and thus not separated. If so, the connection wire 63 is installed and fixed to the outer surface of the ICB housing 20 to pass via a region between the bus bars 22.

As described above, the bus bar 22 is electrically connected to the connection portion 16a of the electrode lead 16 at the connection point P described above by means of laser welding. The laser welding is performed by compressively pressing the bus bar 22 and the connection portion 16a of the electrode lead 16 by means of a compression jig, and then irradiating laser (LV) to the connection point P. However, since the connection wire 63 is installed to pass between the bus bars 22, when the bus bar 22 and the electrode lead 16 are compressively pressed using the compression jig, the connection wire 63 is interposed between the compression jig and the ICB housing 20, which may damage the connection wire 63 or cause inferior welding between the bus bar 22 and the electrode lead 16.

However, since the connection wire 63 is installed and fixed to the wire fixing recess 27a indented toward the inner surface of the ICB housing 20 in comparison to the connection point P, it is prevented that the connection wire 63 is interposed between the compression jig and the ICB housing 20. Therefore, the battery module 1 may prevent inferior welding caused by bad adhesion between the bus bar 22 and the electrode lead 16, and may also prevent that the connection wire 63 is damaged to cut an electric connection between the secondary battery 10 and the measurement circuit.

Meanwhile, as shown in FIG. 9, the connector assembly 60 may further include a temperature sensor 66 configured to come into contact with a predetermined temperature measurement point of the cartridge laminate 10 to sense temperature of the secondary batteries 12, and a conductive wire 67 for electrically connecting the temperature sensor 66 to the main connector.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module and a battery pack including the same, which is particularly applicable to industries associated with secondary batteries.

What is claimed is:

1. A battery module, comprising:
    a cartridge laminate including a plurality of secondary batteries, each secondary battery having an electrode lead, and a plurality of cartridges, each cartridge configured to respectively accommodate at least one secondary battery among the plurality of secondary batteries;
    an integrated circuit board (ICB) housing having an inner surface facing the plurality of cartridges and an outer surface opposite the inner surface;
    a first bus bar connected to at least one of the electrode leads at a predetermined connection point;
    a sensing unit having a main connector, a sub-connector and a connection wire disposed to extend along the outer surface of the ICB housing and connected to the first bus bar to allow voltages of the secondary batteries to be sensed;
    a wire fixing unit having a wire fixing recess formed in the outer surface of the ICB housing; and
    a main connector fixing unit at an upper side of the first bus bar, a sub-connector fixing unit, the first bus bar being between the main connector fixing unit and the sub-connector fixing unit,
    wherein at least a part of the connection wire is inserted into and fixed in the wire fixing recess, and
    wherein the wire fixing recess is formed to be indented toward the inner surface of the ICB housing in comparison to the connection point of the first bus bar and the electrode leads.

2. The battery module according to claim 1, further comprising a lead hole in the ICB housing,
    wherein the at least one electrode lead passes through the lead hole.

3. The battery module according to claim 2, wherein the first bus bar is coupled to the outer surface of the ICB housing, and
    wherein the at least one electrode lead has a connection portion formed by bending an end of the at least one electrode lead, which protrudes out of the ICB housing through the lead hole, at a predetermined angle, and the connection portion is connected to the first bus bar at the connection point.

4. The battery module according to claim 3, wherein the first bus bar and the connection portion are connected at the connection point by means of laser welding.

5. The battery module according to claim 1, further comprising a plurality of insertion protrusions protruding from the wire fixing recess at predetermined intervals so that the connection wire is inserted into the wire fixing recess.

6. The battery module according to claim 1, wherein the sensing unit further includes:
a sensing connector assembly having a sensing wire connected to the first bus bar and a sensing connector coupled to an end of the sensing wire,
wherein the sub-connector is coupled and connected to the sensing connector and the main connector is coupled and connected to a circuit connector included in an external measurement circuit and electrically connected to the sub-connector by means of the connection wire.

7. A battery module, comprising:
a cartridge laminate including a plurality of secondary batteries, each secondary battery having an electrode lead, and a plurality of cartridges, each cartridge configured to respectively accommodate at least one secondary battery among the plurality of secondary batteries;
an integrated circuit board (ICB) housing having an inner surface facing the plurality of cartridges and an outer surface opposite the inner surface;
a bus bar connected to at least one of the electrode leads at a predetermined connection point;
a sensing unit having a main connector, a sub-connector and a connection wire and a connection wire disposed to extend along the outer surface of the ICB housing and connected to the bus bar;
a main connector fixing unit at an upper side of the bus bar, a sub-connector fixing unit, the bus bar being between the main connector fixing unit and the sub-connector fixing unit; and
a wire fixing unit having a wire fixing recess formed in the outer surface of the ICB housing and located near the inner surface of the ICB housing in comparison to the connection point,
wherein at least a part of the connection wire is inserted into and fixed in the wire fixing recess, and
wherein the wire fixing recess is formed to be indented toward the inner surface of the ICB housing in comparison to a connection point of the first bus bar and the electrode leads.

8. A battery pack, comprising the battery module defined in claim 1.

9. A vehicle, comprising the battery pack defined in claim 8.

10. A battery pack, comprising the battery module defined in claim 7.

11. A vehicle, comprising the battery pack defined in claim 10.

12. The battery module according to claim 1, further comprising a second bus bar, wherein the recess extends between the first bus bar and the second bus bar.

* * * * *